United States Patent
Lappan et al.

(10) Patent No.: US 6,920,898 B2
(45) Date of Patent: Jul. 26, 2005

(54) HIGH-PRESSURE VALVE

(75) Inventors: Rolf Lappan, Cologne (DE); Martin Nowak, Burscheid (DE); Michael Benra, Witten (DE); Dirk Hunkel, Aachen (DE)

(73) Assignee: Pierburg GmbH, Neuss (DE)

( * ) Notice: Subject to any disclaimer, the term of this patent is extended or adjusted under 35 U.S.C. 154(b) by 73 days.

(21) Appl. No.: 10/359,004

(22) Filed: Feb. 5, 2003

(65) Prior Publication Data

US 2003/0155544 A1 Aug. 21, 2003

(30) Foreign Application Priority Data

Feb. 7, 2002 (DE) .......................................... 102 04 988

(51) Int. Cl.$^7$ ............................................. F16K 39/02
(52) U.S. Cl. ................................................. 137/630.14
(58) Field of Search .................. 137/625.5, 630.14, 137/630.15, 630.19, 630.2, 630.21, 630.22

(56) References Cited

U.S. PATENT DOCUMENTS

| | | | | |
|---|---|---|---|---|
| 1,534,877 A | * | 4/1925 | Simmons | 137/328 |
| 1,769,621 A | * | 7/1930 | Chace | 137/629 |
| 2,367,647 A | * | 1/1945 | Mott | 451/99 |
| 3,128,792 A | | 4/1964 | Rule | 137/625.5 |
| 3,870,079 A | * | 3/1975 | Finke et al. | 137/630.14 |
| 3,955,597 A | | 5/1976 | Oneyama et al. | 137/625.25 |
| 4,509,548 A | | 4/1985 | Grasso | 137/99 |

FOREIGN PATENT DOCUMENTS

| | | |
|---|---|---|
| DE | 1014810 | 8/1957 |
| DE | 1082785 | 6/1960 |
| DE | 1095609 | 12/1960 |
| GB | 1471324 | 3/1977 |
| JP | 55017763 A | 2/1980 |

OTHER PUBLICATIONS

Renius, K., Traktoren—Technik und ihre Anwendung BLV–Verlagsgesellschaft München, 2. Auflage, 1987, S. 156.

* cited by examiner

Primary Examiner—John Fox
(74) Attorney, Agent, or Firm—Ohlandt, Greeley, Ruggiero & Perle, L.L.P.

(57) ABSTRACT

A high-pressure valve comprises an intake channel and two outlet channels. Further, an actuator is provided for opening and closing the outlet channels. According to the invention, the actuator is provided with a connection channel. The connection channel makes it possible to reduce a pressure difference between the intake channel and the closed outlet channel prior to opening the outlet channel. For this purpose, a channel opening will be opened by displacement of a control element arranged in the connection channel.

18 Claims, 4 Drawing Sheets

HIGH-PRESSURE VALVE

FIELD OF THE INVENTION

The present invention relates to a high-pressure valve which is suited particularly for use in automobiles in connection with fuel and exhaust pipes. The instant high-pressure valve is particularly useful for supply pipes to fuel cells which are provided for conveying e.g. hydrogen. The invention relates both to a 3/2-way valve such as a bypass valve, and a 2/2 way-valve such as a switch-off valve.

DISCUSSION OF THE BACKGROUND ART

Known 2/2- or 3/2-way valves comprise an intake channel and one or two outlet channels. In a 2/2-way valve, the intake channel is connected to the sole outlet channel. The outlet channel can be opened or closed by means of an actuator which can be provided, for instance, as a displaceable piston. A 2/2-way valve can also be designed as a controlling valve wherein the position of the actuator will control the size of a passage opening and thus the size of a mass flow passing through the valve. A conventional 3/2-way valve has two outlet channels formed therein, one of these outlet channels normally being closed by an actuator. Further, both of the above types of valves are provided with a drive element connected to the actuator. The drive element, provided e.g. as an electrical drive unit such as a stepping motor, serves for moving the actuator.

Particularly in automobile technology, a requirements exists that valves be switchable by use of small actuating forces so as to allow the use of small-sized and light-weighted drive elements. Further, strict requirements exist with regard to leak-tightness. For an exact regulating and controlling of processes, for instance, leakage caused by valves are disadvantageous. Valves have to be particularly leak-tight when used in connection with fuel cells. In fuel cells, which are normally operated by use of a mixture of hydrogen and oxygen or air, it must be safeguarded that, e.g., no undesired mixing of oxygen and hydrogen occurs because already a hydrogen portion of as little as 3% would result in an explosive hydrogen/oxygen mixture. In known valves, high leak-tightness can be obtained e.g. in that an actuator, formed as a piston, is pressed against a sealing with considerable force.

SUMMARY OF THE INVENTION

It is an object of the invention to provide a high-pressure valve which can be switched by low actuating forces and which further fulfils high leak-tightness requirements.

In the invention, an actuator of the high-pressure valve, serving for the opening and closing of the outlet channel, has a connection channel formed therein. Using the connection channel in the actuator, the valve's overpressure side can be connected to the underpressure side, wherein, in the closed condition of the outlet channel, overpressure prevails in the intake channel and underpressure prevails in the outlet channel. According to the invention, it is provided that the connection channel serving for the reduction of the pressure difference between the intake and outlet channels, is adapted to be opened and closed. In the closed condition of the outlet channel, also the connection channel is closed. For opening the outlet channel, there is first opened the connection channel provided in the actuator, allowing a flow of medium from the intake channel to the outlet channel via the connection channel. This will result in a reduction of the pressure difference between the intake and outlet channels. Thereafter, due to the thus reduced pressure difference, the actuator can be operated more easily, since, in case of a small pressure difference which is preferably approximately zero, the required force for moving the actuator will be much smaller than in case of large pressure differences. Thus, by the provision of a connection channel in the actuator, a high-pressure valve is obtained wherein the actuator can be operated by low actuation forces. This offers the advantage of allowing for drive elements of much smaller sizes than in conventional valves.

Preferably, for opening and closing the connection channel, a displaceable control element is provided in the connection channel. The control element is preferably formed as a control piston. Displacement of the control element will open or close an opening of the connection channel arranged to connect the connection channel to the outlet channel. In this regard, a control element, configured e.g. as a control piston, is formed with a sealing face provided with a seal. In order to establish a connection between the intake channel and the outlet channel after the channel opening has been opened, the control piston is provided e.g. with a through bore arranged outside the sealing face. Further, the control piston can have a flattened portion or the like formed thereon so that the control piston will not abut by its whole periphery on an inner side region of the connection channel.

The control element has connected thereto a drive element for displacing the control element. Preferably, the inventive high-pressure valve is configured in such a manner that the same drive element serves for actuating both the control element and the actuator alike. Preferably, in this arrangement, the drive element is connected to the control element and the control element is connected to the actuator. Therefore, using the drive element, there is first effected a displacement of the control element so that the channel opening of the connection channel will be opened, and, upon further displacement of the control element, the actuator is taken along so that the outlet channel will be opened. Preferably, for this purpose, entrainment means are provided by which the control element is connected to the actuator. The entrainment means can be provided as one or a plurality of pins guided in one or a plurality of grooves. As soon as, after the displacement of the control element, the pin has reached one end of the groove, the actuator will thereby be automatically carried along.

In case of a 3/2-way valve, the high-pressure valve of the invention comprises two outlet channels. Preferably, as provided by the invention, the opening and closing of the two outlet channels is performed by a sole actuator. For this purpose, the actuator connected to the drive element is e.g. reciprocated so that, at all times, one of the two outlet channels is in the opened state and the other one is in closed state. Further, it is possible to arrange the actuator in an intermediate position so that both outlet channels will be opened. This provision also makes it possible to control the mass flow supplied to the two outlet channels.

According to the invention, particularly in a 3/2-way valve, the connection channel comprises two channel openings, each of them being openable and closable by displacement of the control element.

The invention will be explained in greater detail hereunder with reference to a preferred embodiment of an inventive 3/2-way valve.

DETAILED DESCRIPTION OF THE PREFERRED EMBODIMENT

Figure 1:
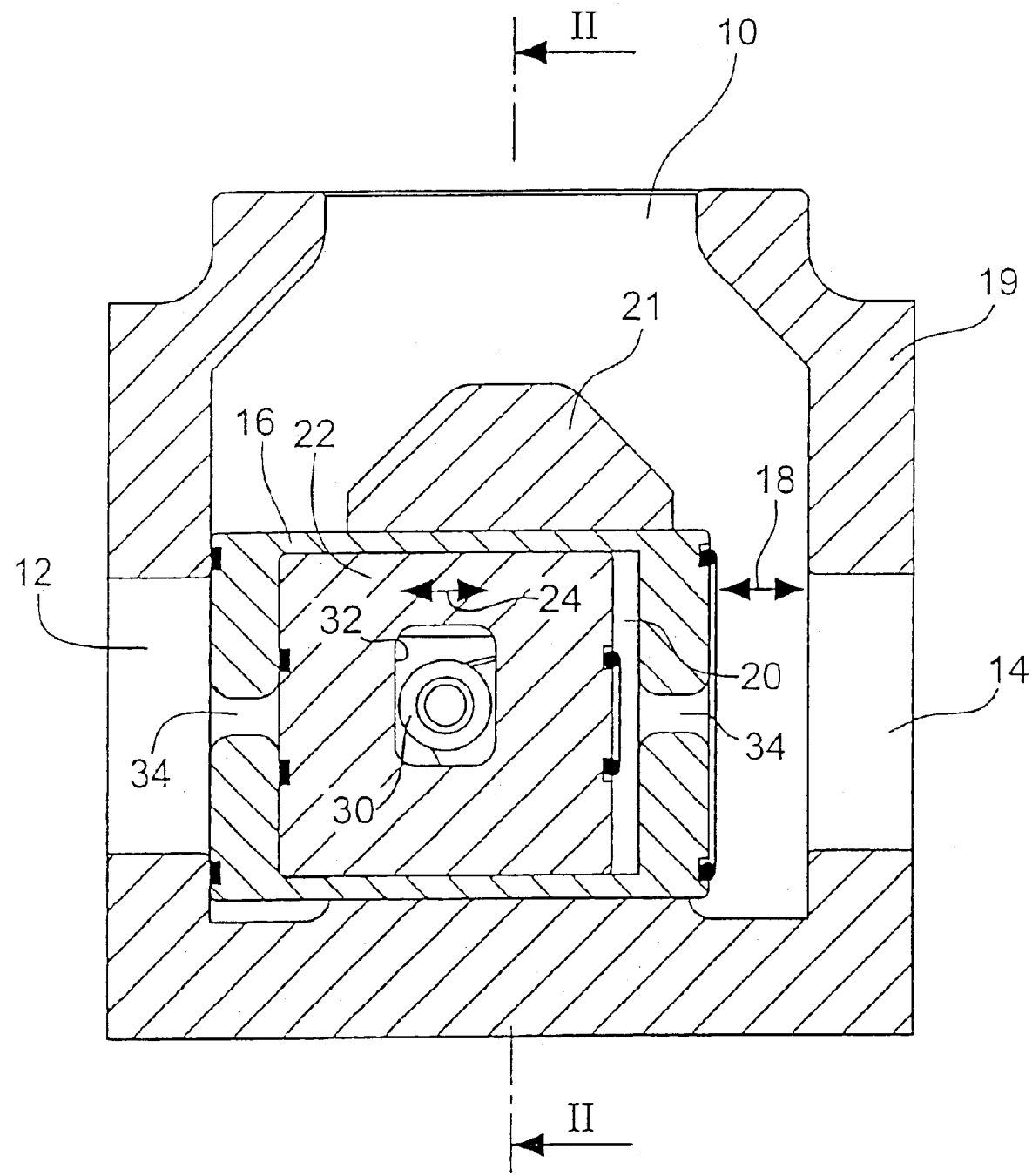
FIG. 1 is a schematic sectional view of the high-pressure valve.
Figure 2:
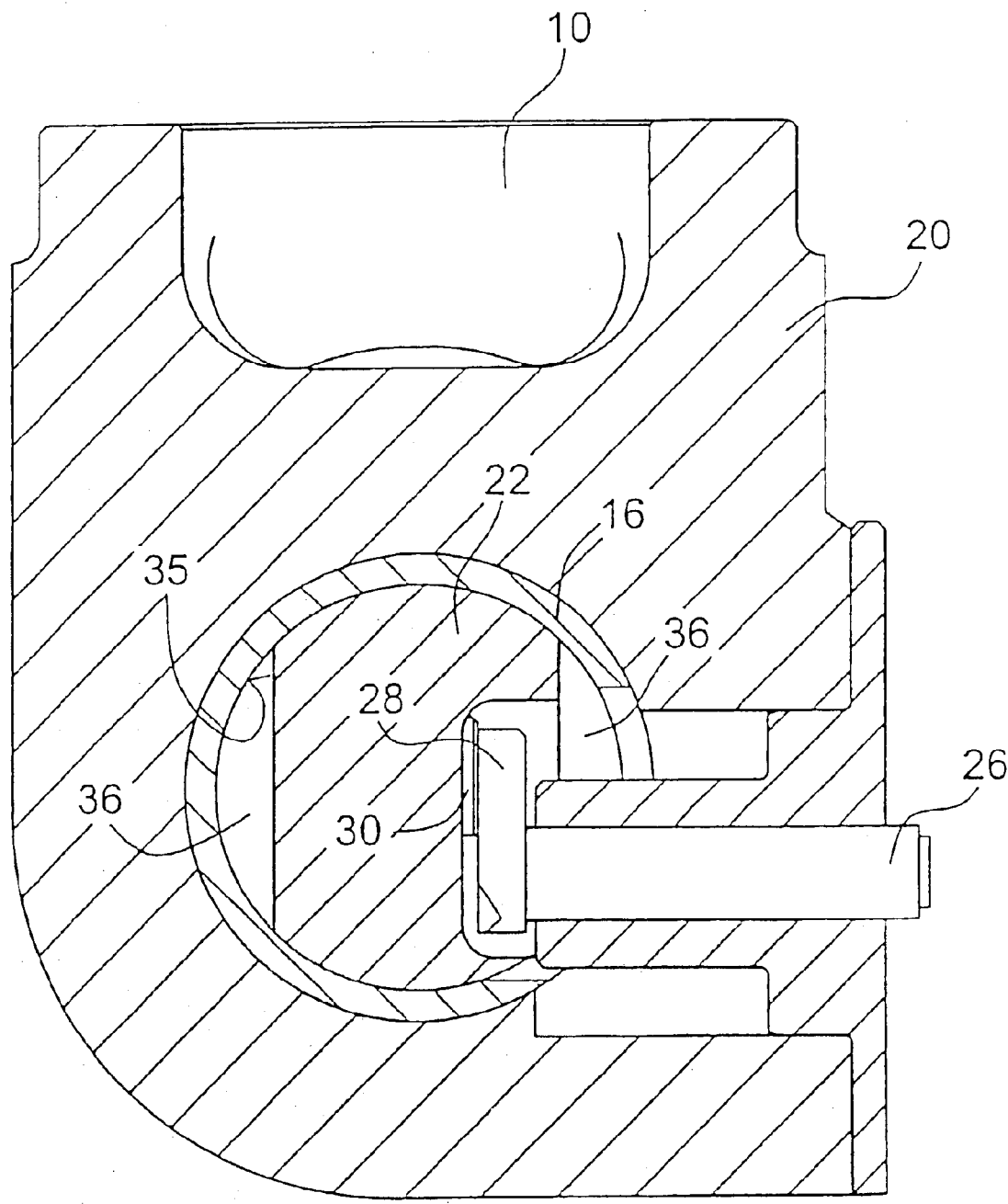
FIG. 2 is a schematic sectional view taken along the line II—II in FIG. 1.

The high-pressure valve comprises an intake channel 10 and two outlet channels 12,14. Depending on the position of an actuator 16, the intake channel 10 is connected to one of the two outlet channels 12,14. In an intermediate position of actuator 16, intake channel 10 is connected with both outlet channels 12,14. In the illustrated embodiment, the actuator 16 is provided as a cylindrical piston arranged to be reciprocated in the directions of twin arrow 18. For guidance of the actuator 16, a housing 19 of the high-pressure valve is provided with a bearing web 21. The actuator or actuator piston 16 is formed with a cavity 20 which in the illustrated embodiment is of a cylindrical shape and which accommodates a control element 22 therein; in the instant embodiment, the control element 22 is provided as a control piston. The control piston 22 can be reciprocated within cavity 20 in the directions indicated by twin arrow 24. The two pistons 16,22 are arranged coaxially with each other. For displacing the actuator piston 16, a drive unit such as an electrical stepping motor (not illustrated) is provided. The latter is connected to the control piston 22 via a shaft 26 (FIG. 2) having an eccentric 28 mounted thereon. Rotation of shaft 26 causes a displacement of control piston 22 and, along therewith, a displacement of actuator piston 16 (see FIGS. 3–6). Eccentric 28 is connected to a pin 30 extending into a cutout portion 32 of control piston 22.

To make it possible to displace the actuator 16 by application of merely small actuating forces even in case of high pressure differences between the intake channel 10 and the closed outlet channel 12, the actuator is, according to the invention, provided with a connection channel. The connection channel comprises two bores 34 provided in actuator 16 and connecting to the cavity formed in the actuator 16, thus forming a connection channel 36, with the piston 22 being provided with flattened portions and therefore not completely abutting an inner side 35 of actuator piston 16. In this manner, control element 22 is arranged internally of the connection channel.

Figure 3:
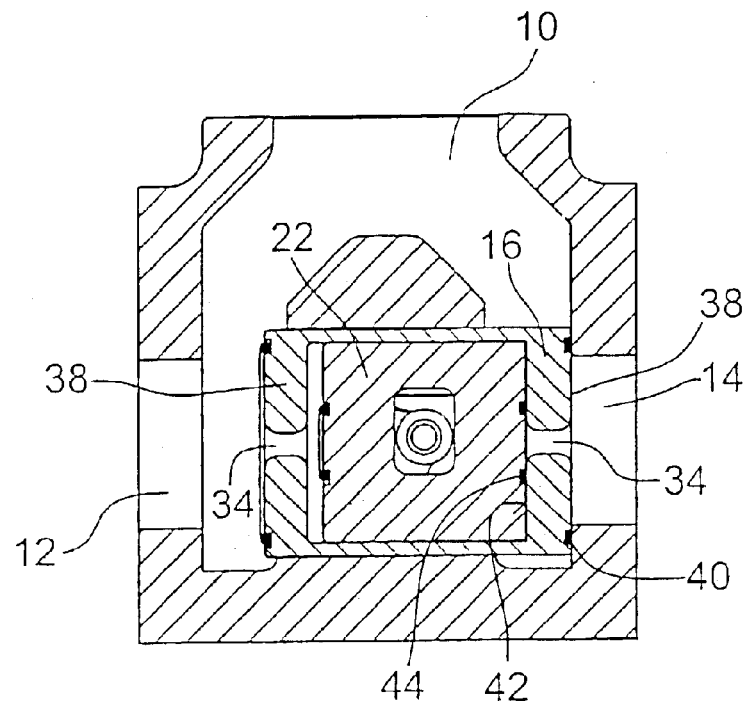
FIGS. 3–6 are views of different switching states of the 3/2-way valve shown in FIG. 1.

The moving sequence of the actuator 16 will be will be explained hereunder in greater detail with reference to FIGS. 3–6:

In FIG. 3, outlet channel 14 is closed by actuator 16. For this purpose, the actuator on its sealing side 38 is formed with a sealing face provided with an annular sealing 40. The sealing between intake channel 10 and outlet channel 14 is effected through the annular sealing 40 which is compressed by actuator 16. Since the bores 34 together with the connection channel 36 would allow a connection to be generated between intake channel 10 and outlet channel 14 through the actuator 16, also the bore 34 pointing in the direction of outlet channel 14 has to be sealed. To effect this sealing, the control piston 22 is pressed against an abutment face 42, thus compressing an annular sealing 44 surrounding the bore 34. In this manner, connection channel 34,36 is closed.

Figure 4:
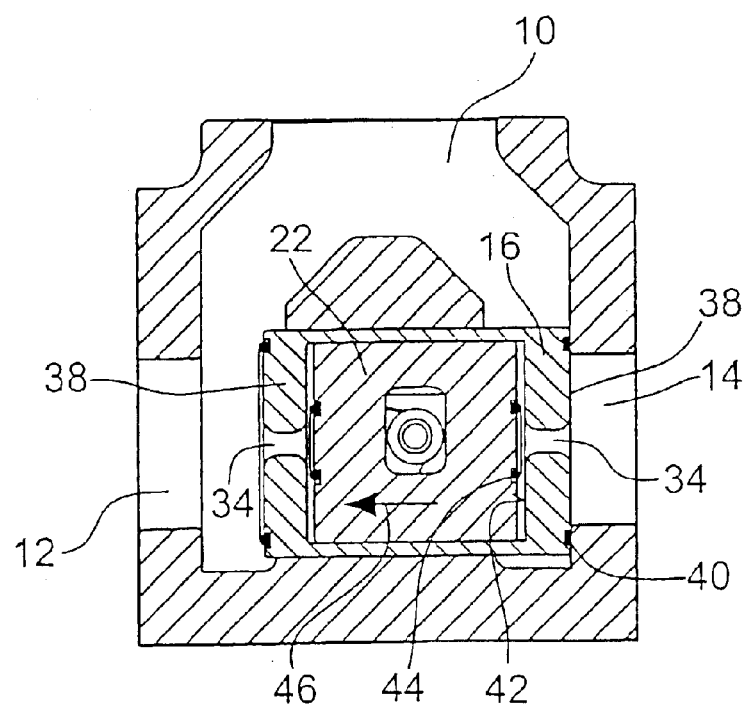

To open the outlet channel 14, the drive element will be used to turn the shaft 26 together with the eccentric 28 in such a manner that the control element 22 will be displaced in the direction of arrow 46 (FIG. 4). As a result, the bore 34 facing in the direction of outlet channel 14 and forming one of the two channel openings 34 of the connection channel, will be opened. In this manner, an equalization of pressure is effected between intake channel 10 and outlet channel 14 because a medium flow takes place via the bores 34 and the connection channel 36 into the outlet channel. The pressure difference between intake channel 10 and outlet channel 14 is thus considerably reduced.

A further displacement of control piston 22 in the direction of arrow 46 will cause the control piston 22 to abut onto a left-hand abutment face 42 (in the constellation as presented in FIG. 5) of actuator 16.

Figure 5:
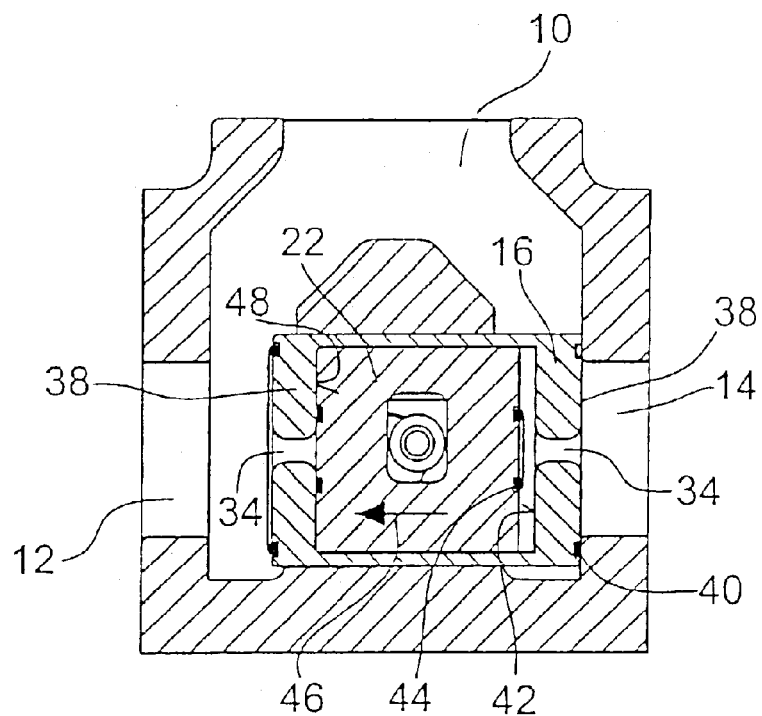

During a further movement of control piston 22 in the direction of arrow 46, the abutment face 48 in the illustrated embodiment serves as an entrainment element since, in the position shown in FIG. 5, a further movement of control piston 22 will cause also the actuator piston 16 to be moved in the direction of arrow 46. This movement is continued until reaching the position illustrated in FIG. 6, in which the outlet channel 12 is closed. In the process, a sealing ring 50, arranged in the second sealing side 38 facing in the direction of outlet channel 12, is compressed and thus generates a sealing effect between intake channel 10 and outlet channel 12. The channel opening 34 facing in the direction of outlet channel 12 is tightly sealed by a sealing ring 52 compressed by control piston 22. In this regard, it is to be noted that, via the right-hand bore 34 (in the constellation as presented in FIG. 6), medium will enter the cavity 20 of actuator 16 and thus exert pressure onto control piston 22, thus pressing piston 22 towards the left in FIG. 6. This enhances the sealing effect obtained between intake channel 12 and outlet channel 12 by means of the two sealing rings 48,50, thus making it possible to meet high demands to the sealing tightness.

Figure 6:
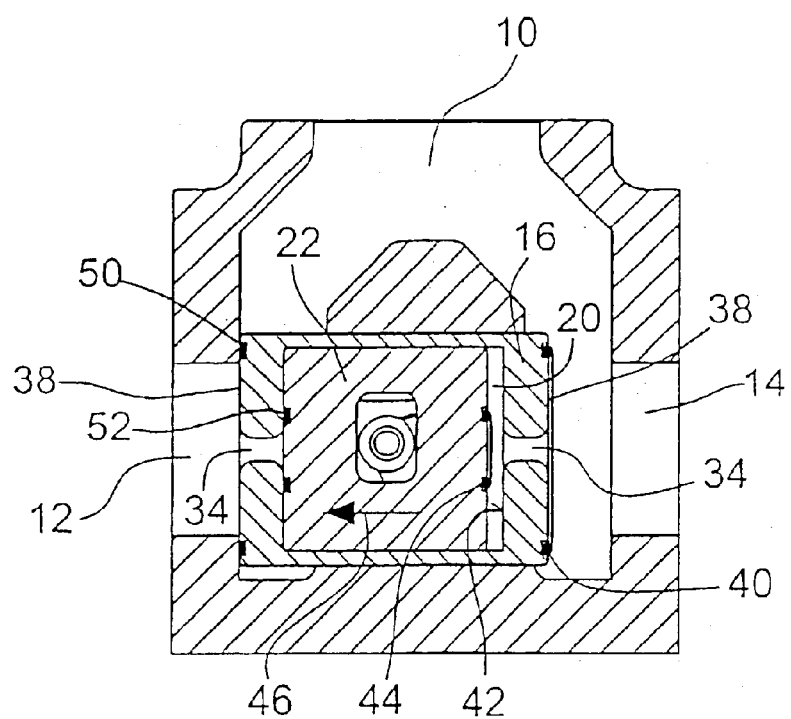

For opening the outlet channel 12 and subsequently closing the outlet channel 14, the control piston 22 and the actuator piston 16 will be displaced in reverse order, i.e. from the position shown in FIG. 6 via the positions shown in FIGS. 5 and 4 into the position shown in FIG. 3.

The principle described above with reference to a 2/2-way valve is likewise applicable to a 2/2-way valve. Already by closing one of the two outlet channels 12,14, a 2/2-way valve is obtained. In this regard, it is to be considered that, in a 2/2-way valve, only one of the two channel openings 34 need be sealed in the closing position so that the configuration can be simplified.

What is claimed is:

1. A high-pressure valve comprising
an intake channel,
an outlet channel connected to the intake channel,
an actuator for opening/closing the outlet channel,
a drive element connected to the actuator for operating the actuator,
wherein the actuator comprises an openable/closable connection channel for reducing the pressure difference between the intake channel and the outlet channel prior to opening the outlet channel, and
a closable control element arranged in the connection channel for opening/closing the connection channel, the control element being operated by the drive element via an eccentric arranged inside of the actuator.

2. The high-pressure valve according to claim 1 wherein the control element is connected to the drive element via the eccentric, and the actuator is operated by the control element.

3. The high-pressure valve according to claim 2 wherein the actuator is connected to the control element via at least one entrainment means.

4. The high-pressure valve according to claim 3 wherein the control element is arranged to be reciprocated between two abutment faces serving as said entrainment means.

5. The high-pressure valve according to claim 1 wherein the connection channel comprises two channel openings which can be opened/closed by displacement of the control element.

6. The high-pressure valve according to claim 5 wherein the channel openings are respectively provided in an abutment face.

7. The high-pressure valve according to claim 1 wherein two outlet channels are provided which can be opened/closed by the actuator.

8. The high-pressure valve according to claim 7 wherein the actuator is displaceable for opening/closing the two outlet channels.

9. The high-pressure valve according to claim 7 wherein the actuator comprises two sealing sides arranged to face towards respectively one of the two outlet channels.

10. The high-pressure valve according to claim 9 wherein the two outlet channels have openings that are respectively arranged in one of the sealing sides.

11. The high-pressure valve according to claim 1 wherein the actuator is provided as a displaceable actuator piston and/or the control element is provided as a control piston.

12. The high-pressure valve according to claim 1 wherein the actuator and the control element are arranged coaxially with each other.

13. The high-pressure valve according to claim 1 wherein the eccentric is operated by a shaft that is perpendicular to a moving direction of the control element.

14. The high-pressure valve according to claim 1 wherein the eccentric is connected to a pin extending into a cut-out portion of the control element.

15. A high-pressure valve comprising:

an intake channel;

an outlet channel;

a first piston disposed between the intake and outlet channels, the first piston being movable to selectively open and close the outlet channel;

a second piston coaxially disposed in the first piston; and a shaft having an eccentric mounted thereon so that rotation of the shaft about an axis causes displacement of the second piston in a direction perpendicular to the axis, the second piston causing displacement of the first piston.

16. The high-pressure valve according to claim 15, wherein the eccentric is arranged inside of the first piston.

17. The high-pressure valve according to claim 15, further comprising a connection channel through the first piston for selectively reducing a pressure difference between the intake channel and the outlet channel prior to opening the outlet channel.

18. The high-pressure valve according to claim 15, wherein the second piston is movable within the first piston to selectively open and close the connection channel.

* * * * *